US012734866B2

(12) United States Patent
Lewis et al.

(10) Patent No.: US 12,734,866 B2
(45) Date of Patent: Sep. 15, 2026

(54) PIVOTAL SOFT TOP COVER WITH LIFT ASSIST

(71) Applicant: Bestop, Inc., Louisville, CO (US)

(72) Inventors: Stephen J. Lewis, Harrison Township, MI (US); Eric D. Getzschman, New Baltimore, MI (US); Duane C. Junkin, Madison Heights, MI (US); David A. Smith, Macomb Township, MI (US); Charles C. Turney, Toledo, OH (US); Edward S. Piec, Warren, MI (US); Jonathon G. Moore, Chesterfield, MI (US); Brandon Kincaid, Curtice, OH (US); Eric J. Hanson, Dearborn, MI (US)

(73) Assignee: Bestop, Inc., Westminister, CO (US)

( * ) Notice: Subject to any disclaimer, the term of this patent is extended or adjusted under 35 U.S.C. 154(b) by 710 days.

(21) Appl. No.: 18/171,834

(22) Filed: Feb. 21, 2023

(65) Prior Publication Data

US 2023/0264547 A1 Aug. 24, 2023

Related U.S. Application Data

(60) Provisional application No. 63/311,618, filed on Feb. 18, 2022.

(51) Int. Cl.
*B60J 7/12* (2006.01)

(52) U.S. Cl.
CPC ........... *B60J 7/1247* (2013.01); *B60J 7/1265* (2013.01)

(58) Field of Classification Search
None
See application file for complete search history.

(56) References Cited

U.S. PATENT DOCUMENTS

| | | | | |
|---|---|---|---|---|
| 2,581,660 A * | 1/1952 | Horton | B60J 7/1273 | 296/117 |
| 4,898,420 A * | 2/1990 | Takada | B60J 7/1291 | 296/219 |
| 5,299,850 A * | 4/1994 | Kaneko | B60J 7/1291 | 296/107.13 |
| 6,022,064 A * | 2/2000 | Robbins | B60J 7/1204 | 296/107.12 |

(Continued)

FOREIGN PATENT DOCUMENTS

| | | |
|---|---|---|
| JP | S6194816 A | 5/1986 |
| JP | H08207592 * | 8/1996 |
| WO | 2022015852 A1 | 1/2022 |

OTHER PUBLICATIONS

International Search Report for PCT/US2021/041624 dated Oct. 4, 2021, 1-page.

*Primary Examiner* — Joseph D. Pape
(74) *Attorney, Agent, or Firm* — Butzel Long; Gregory Ozga

(57) ABSTRACT

A soft top cover assembly including a pivotal portion adapted for attaching at a roof top opening of a vehicle to selectively close off the roof top opening and open up the roof top opening for an open-air experience. The assembly has a cover attached to a first bow member of the pivotal portion and a rear header. Selectively rotating the pivotal portion covers and uncovers the roof top opening. The assembly has at least one lift assist assembly to help with controlled rotation of the pivotal portion between the closed and open positions.

19 Claims, 12 Drawing Sheets

(56) References Cited

U.S. PATENT DOCUMENTS

| | | | | |
|---|---|---|---|---|
| 6,073,989 | A | 6/2000 | Hilliard et al. | |
| 6,206,450 | B1 * | 3/2001 | Ide | B60J 7/1291 296/217 |
| 6,241,305 | B1 * | 6/2001 | Troeger | B60J 7/104 160/327 |
| 6,443,519 | B1 | 9/2002 | Betzel et al. | |
| 7,992,919 | B2 | 8/2011 | Huotari et al. | |
| 8,272,677 | B2 | 9/2012 | Nania | |
| 8,356,854 | B2 * | 1/2013 | Haberl | B60J 7/1265 296/121 |
| 9,045,026 | B2 * | 6/2015 | Bennett | B60J 7/1226 |
| 9,346,342 | B1 | 5/2016 | Bowles | |
| 9,776,488 | B2 * | 10/2017 | Bowles | B60J 7/11 |
| 9,931,921 | B2 | 4/2018 | Haberkamp et al. | |
| 10,035,408 | B2 | 7/2018 | Crismon et al. | |
| 10,065,486 | B2 * | 9/2018 | Smith | B60J 7/1291 |
| 10,166,848 | B2 | 1/2019 | Lewis et al. | |
| 10,913,338 | B2 | 2/2021 | Lewis et al. | |
| 11,203,257 | B2 | 12/2021 | Stickles et al. | |
| 11,660,942 | B2 | 5/2023 | Lewis et al. | |
| 11,712,951 | B2 | 8/2023 | Moore et al. | |
| 11,712,952 | B2 | 8/2023 | Lewis et al. | |
| 2014/0103682 | A1 * | 4/2014 | Lewis | B60J 7/028 296/107.13 |
| 2015/0352937 | A1 | 12/2015 | Haberkamp et al. | |
| 2016/0263976 | A1 | 9/2016 | Bowles | |
| 2018/0043757 | A1 | 2/2018 | Haberkamp et al. | |
| 2018/0297456 | A1 | 10/2018 | Stickles et al. | |
| 2020/0130486 | A1 | 4/2020 | Gauci | |
| 2022/0016962 | A1 | 1/2022 | Lewis et al. | |

* cited by examiner

PIVOTAL SOFT TOP COVER WITH LIFT ASSIST

CROSS-REFERENCE TO RELATED APPLICATIONS

This application is a Non-Provisional patent application and claims benefit of U.S. Provisional Patent Application No. 63/311,618, filed Feb. 18, 2022. The disclosures of the above application are incorporated herein by reference.

FIELD OF THE INVENTION

The present invention relates to a folding soft top adapted for a vehicle.

BACKGROUND OF THE INVENTION

Foldable soft tops for SUV vehicles are known in the art. These tops provide a vehicle with an open air experience with the top folded back or provide protection from the elements with the top folded forward. Such tops are typically manually retractable and during retraction the operator has to perform a series of manipulations of the top. The rotating top has some weight that must be managed to move the top between the closed and open positions. Additionally, manual management and stowage of the fabric materials of the top during folding must be accomplished.

Therefore, there remains a need in the art to provide a roof top opening cover deployment that provides easier opening/closing and improved fabric management.

SUMMARY OF THE INVENTION

A pivotal soft top cover assembly incorporating lift assist for a pair of front rails of a pivotal portion. The assembly includes a lift assist assembly incorporating at least an internal strut including a cylinder with plunger arrangement at least partly inside each front rail and including an end cylinder operably adapted to move along a contoured surface of a guide to assist in controlled movement of the pivotal portion between a closed position and at least one open position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
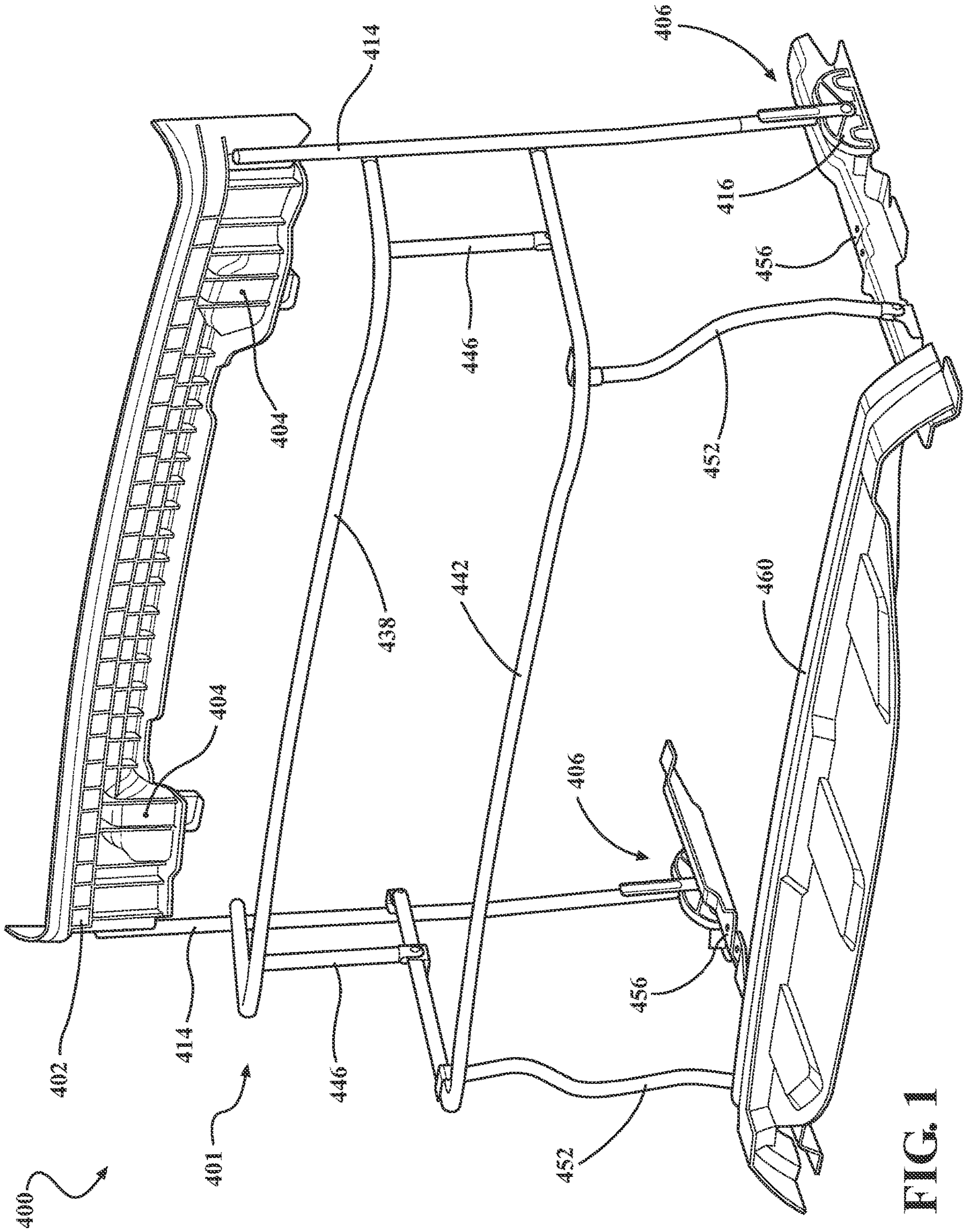
FIG. 1 is a perspective view of perspective view of a soft top cover assembly adaptable for an SUV, in accordance with the present invention.
Figure 2:
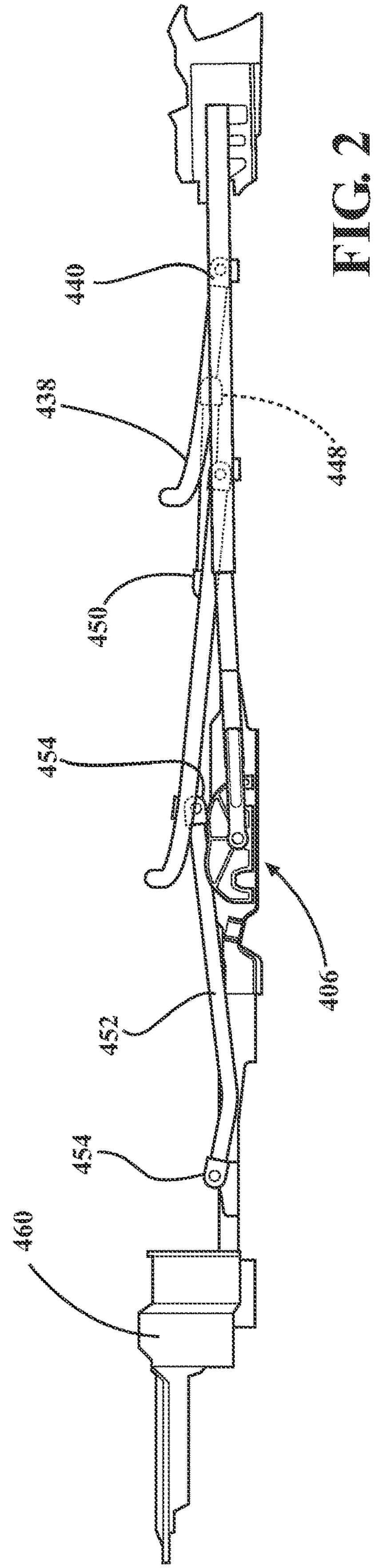
FIGS. 2-4 are side plane views of the soft top cover assembly of FIG. 1 moving from a closed to an exemplary open position, in accordance with the present invention.

The following description of the preferred embodiment(s) is merely exemplary in nature and is in no way intended to limit the invention, its application, or uses.

According to aspects of the present invention there is provided a lift assist assembly incorporating an internal strut including a cylinder with plunger arrangement at least partly inside a front rail and including an end following along a contoured surface, e.g., cam, to assist in moving the front rail between a closed position and at least one open position.

Referring to FIGS. 1-19 generally, there is depicted a soft top cover assembly (or "assembly"), shown generally at FIG. 400, operably adapted for attachment to a sport utility vehicle operable to cover a roof top opening. The assembly 400 includes a pivotal portion 401 operable to rotate between a closed position and an open position.

The assembly 400 includes a front bow 402 or front header adapted to selectively connect to the vehicle at a windshield frame. A plurality of paddle latches 404 or other attachment device(s) suitable for selectively attaching the front tensioned bow 402 to the vehicle in the closed position are provided. The latches 404 are operably released when opening the top 400 for an open air experience is desired. The pivotal portion 401 is selectively rotated rearward to the open position.

There is provided at least one lift assist assembly, shown generally at 406, each incorporating an internal lift mechanism, e.g., internal strut, indicated generally at 408. The internal lift mechanism 408 preferably includes a cylinder 410 with plunger 412 arrangement that is located at least partially inside at least one front rail 414, preferably, one inside both front rails 414 (e.g., See FIGS. 1 and 5-10). The plunger 412 extends into the cylinder 410. The front bow 402 is operably connected between the pair of front rails 414 toward an end of the front rails 414. As the front rail 414 is lifted and rotated from the closed to open position, and vice versa, the rotation is assisted by the lift assist assemblies 406 that are located toward the other end of each both front rails 414. Alternative biased members are contemplated depending on the application without departure from the present invention.

Figure 4:
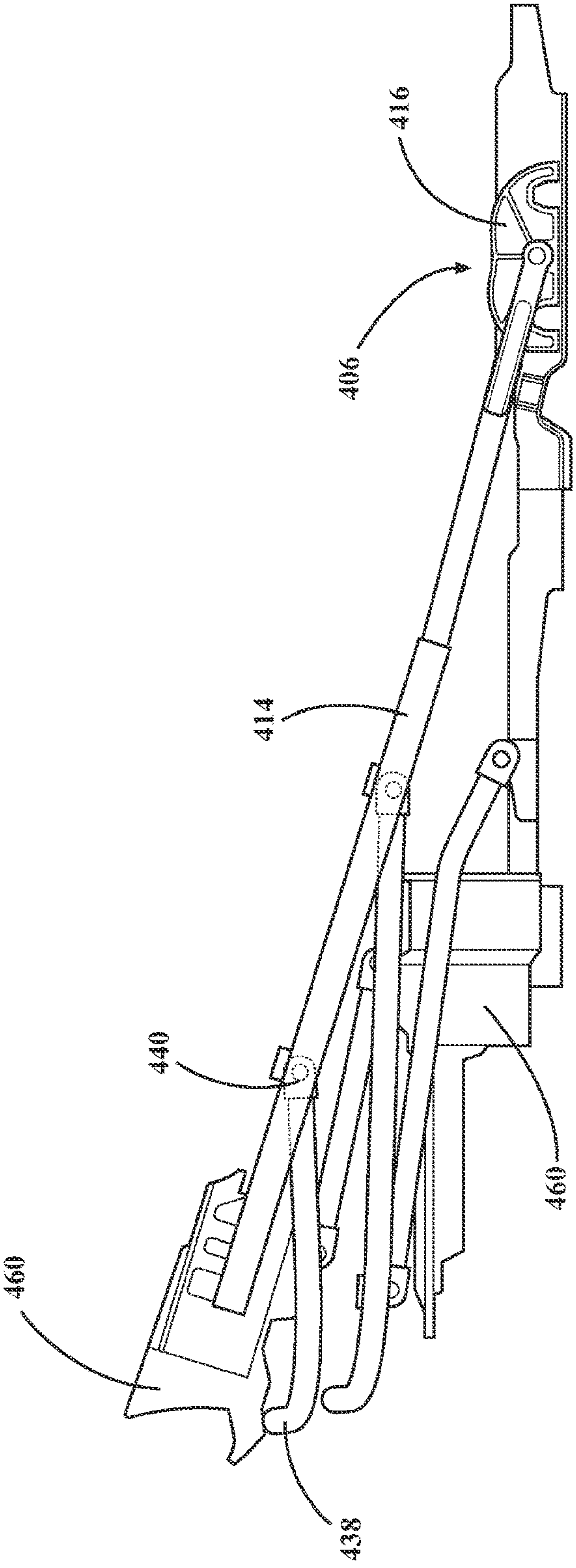
Figure 3:
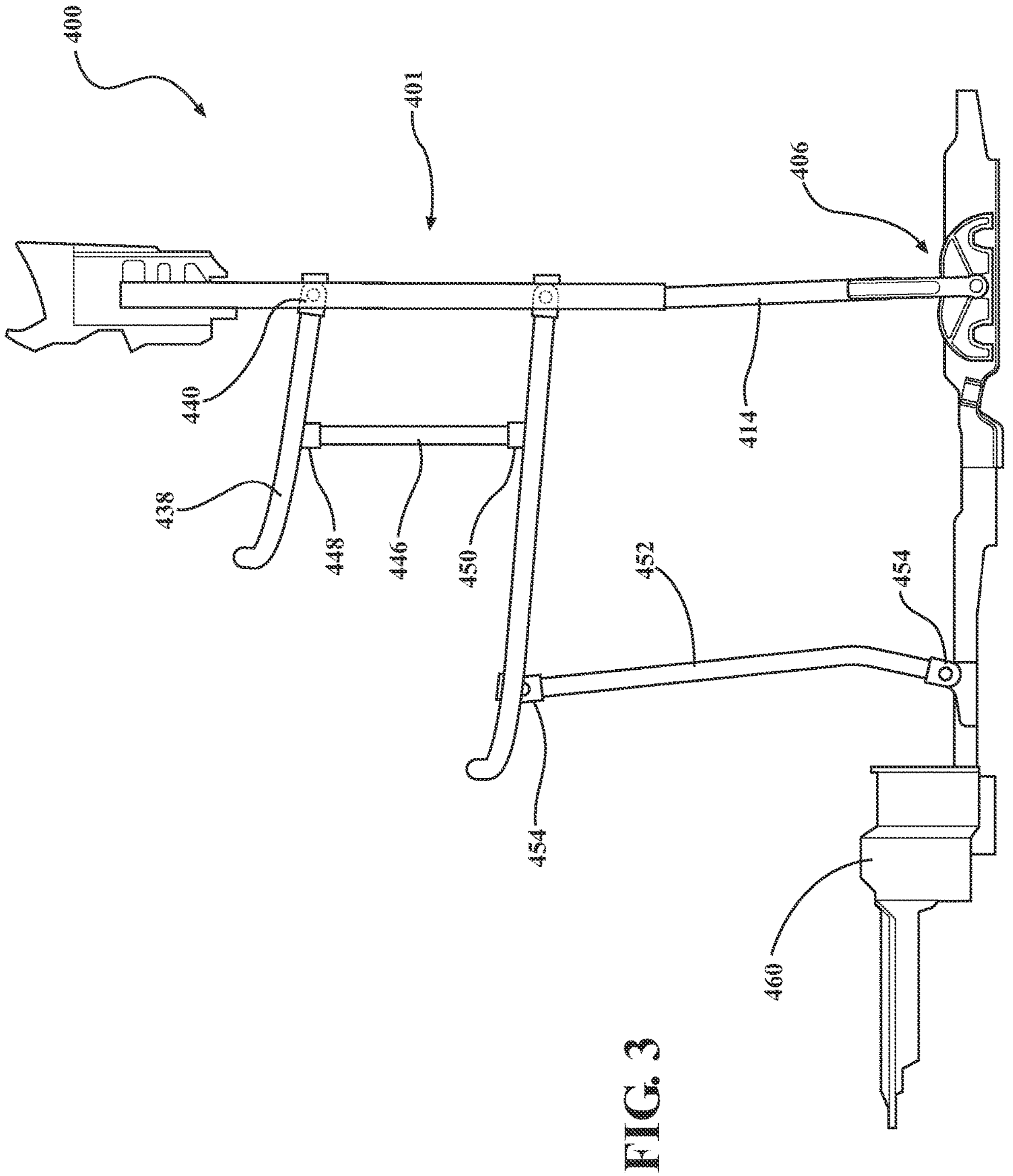
Figure 5:
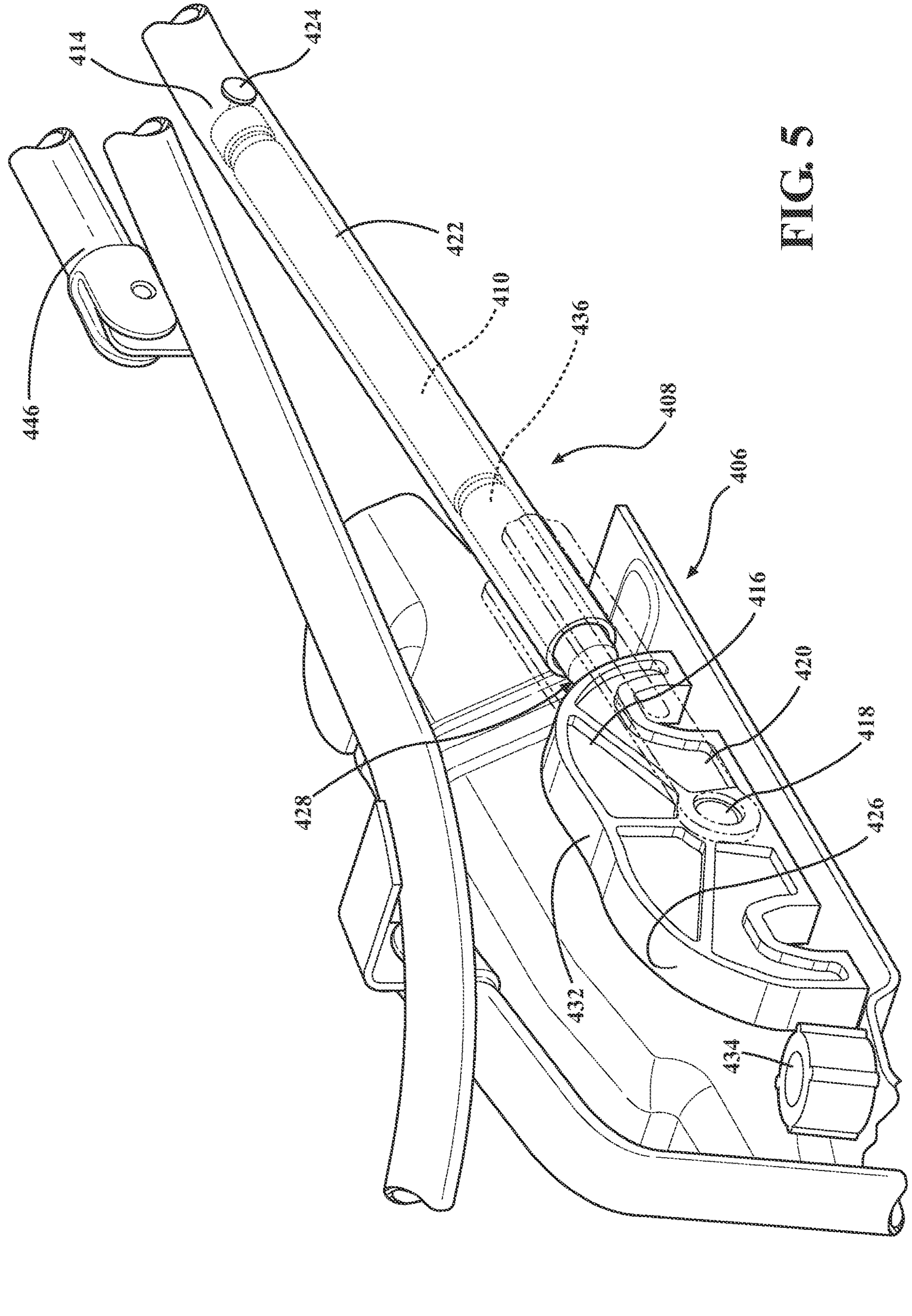
FIG. 5 is a perspective view of lift assist assembly of the soft top cover assembly of FIGS. 1-4, in accordance with the present invention.
Figure 7:
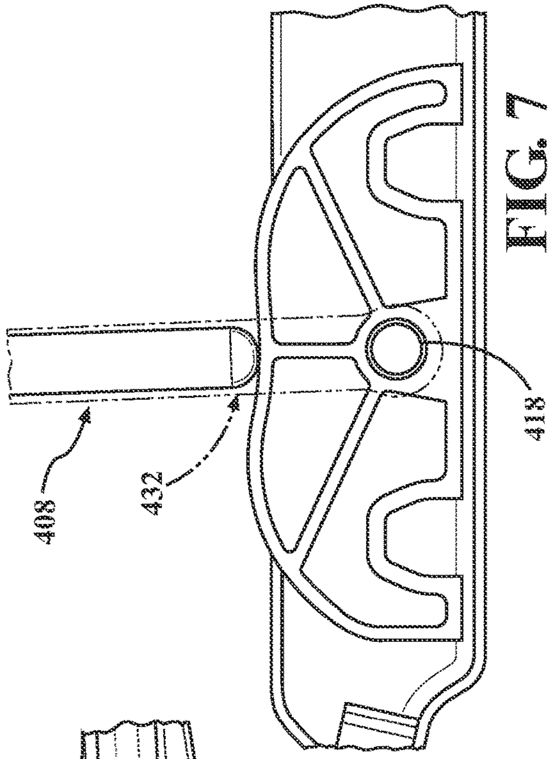
FIGS. 6-8 are enlarged side plane views of the soft top cover assembly including a cylinder in a front rail tube moving from a closed position to an open position, in accordance with the present invention.
Figure 6:
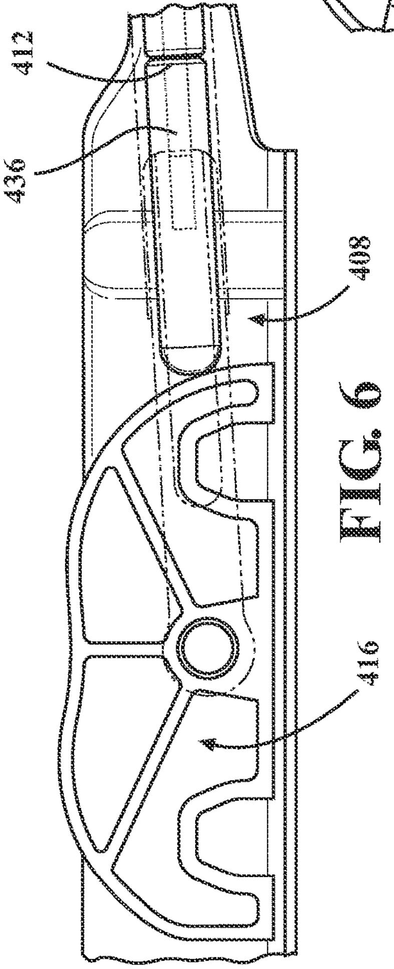
Figure 8:
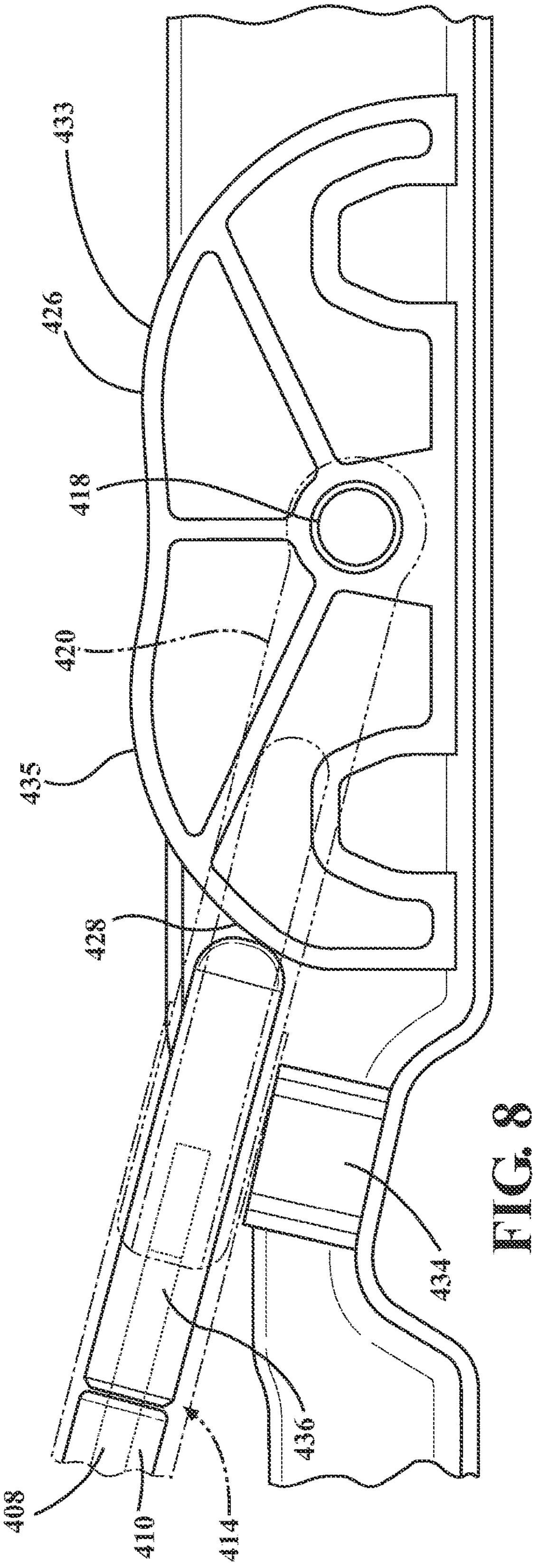
Figure 9:
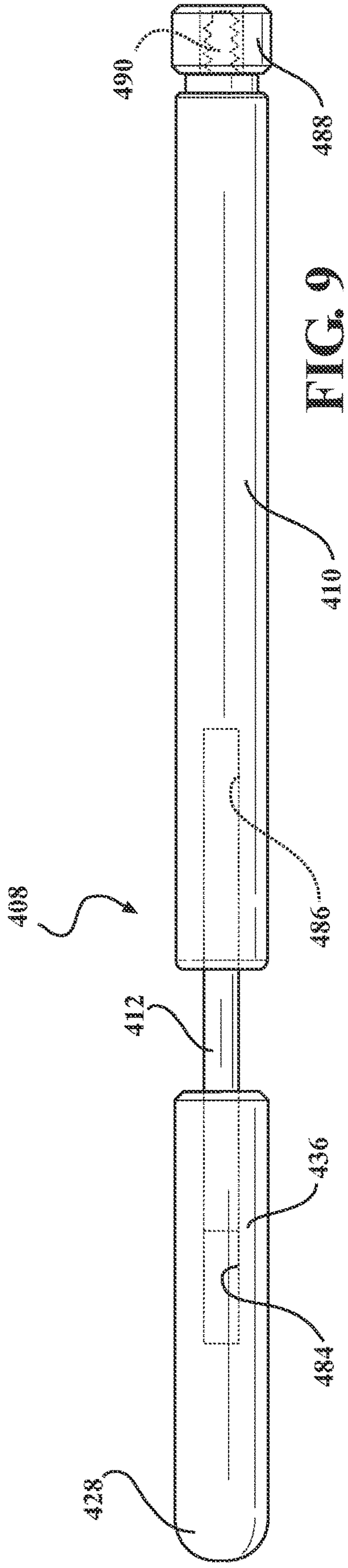
FIGS. 9-10 are cross section views of a lift assist incorporating a cylinder and plunger, in accordance with the present invention.
Figure 10:
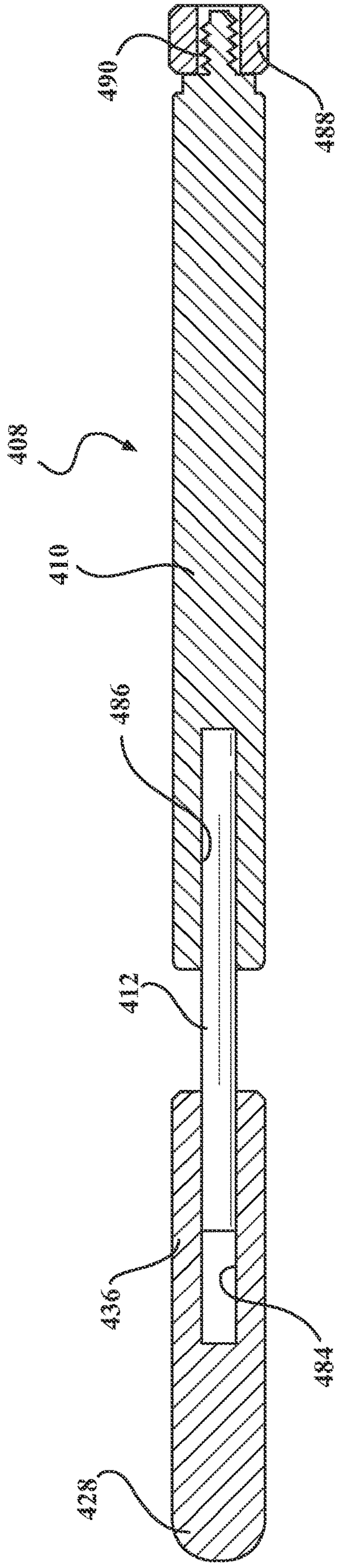

Each front rail 414 generally rotates about a guide element 416 to move between the closed position (e.g., FIGS. 2 and 6) and open position (e.g., FIGS. 4 and 8). The guide element 416 includes at least one pivot joint 418 operably rotatably connecting the front rail 414. Preferably, at least one bracket 420 is located on both sides of the guide element 416 at the pivot joint 418 and connects to the front rail 414. Alternatively, a single bracket 420 is used.

The front rail 414 includes a tubular section 422 (or "front rail tube") to receive the internal strut (e.g., internal gas strut). The cylinder 410 is in the front rail tube 422 and positioned with a stop 424. A plunger 412 moves within the gas strut cylinder 410 and an end cylinder 436 extends past the end of the tubular section 422 to contact the guide 416. Preferably, the end cylinder 436 includes a rounded end 428 that slides along the predetermined guide surface profile.

The lift assist assembly 406 includes the guide 416 or "cam" that has a predetermined contoured surface 426 for the end cylinder 436 to contact as the front rail 414 is moved. As the front rail 414 is moved generally upward from the closed position or open position, the rounded end 428 slides along the contoured surface 426.

In operation the rounded end 428 rides along a predetermined contoured surface 426, e.g., cam, as the front rail 414 rotates about the pivot joint 418, to assist a user in moving the front rails 414, and thereby the pivotal portion 401, between a closed position for the soft cover to close off the opening and at least one open position, e.g., sunroof position, for an open roof top experience, and from the open to the closed position.

As the pivotal portion 401 moves generally up/reward off the closed position the rounded end 428 slides along the surface 426 of the guide 416 and helps to lift and assist in the controlled and smooth rotating of the pivotal portion 401. Once the rounded end 428 reaches generally the middle 432 of the guide surface 426, the lift assist applies a load and cams over to the back area of the guide surface 426 as the pivotal portion 401 continues assisted rotation about the pivot joint 418 until the front rail tube 422 contacts a stop 434 in the fully open position. Preferably, the cam action, and corresponding contours, are on both ends of the middle 432 (fore 433/aft 435), which provides a smoother assist.

Alternatively, the guide 416 has no downward curved or concave middle 432. Alternatively, the middle 432 has a generally outward curved or convex middle 432 glide surface profile. Alternatively, at least one detent is provided. Alternatively, a more aggressive profile of the guide surface is provided. It is further understood that any predetermined profile of the guide surface(s) 426 suitable for providing a predetermined lift assist is contemplated depending on the application without departure from the scope of the present invention. By way of non-limiting example, depending upon predetermined soft top cover geometry, curves, angles, linkage ratios, predetermined lift assist force, size, length, diameter, rating, compressed length, extended length, stroke, or any other correlating components and geometry, etc. The guide 416 is made of a predetermined durable material, e.g., such as a hard ramp plastic.

By way of non-limiting example, the lift assist assembly 406 can function like a buffering lift assist. By way of non-limiting example, the lift assist assembly 406 can function such that the moment a user lifts the top 400 from the open position or closed position, the front rail 414/lift assist 406 is operably pushing (providing resistance), while the z-axis/up (e.g., of the front rail 414 during rotation) has none, or vice versa or any combination.

The plunger 412, e.g., smaller diameter plunger (alternatively, a rod, suitably displaceable feature, etc.) is located in a hollow space 484 in the end cylinder 484 and the other end of the plunger 412 is located in a hollow space 486 in the cylinder 410.

At least the cylinder 410 is an enclosed, sealed cylinder. Typically, the plunger 412 occupies some predetermined space within the sealed cylinder(s) of the lift assist mechanism 208 preventing gas from occupying that same space and creating an increased pressure, e.g., compressed, of the gas in the cylinder(s) for predetermined controlled motion, e.g., opening to the open position and closing to the closed position.

At least one end attachment 488 is provided and preferably includes a threaded member 490 or another suitable fastener.

Figure 19:
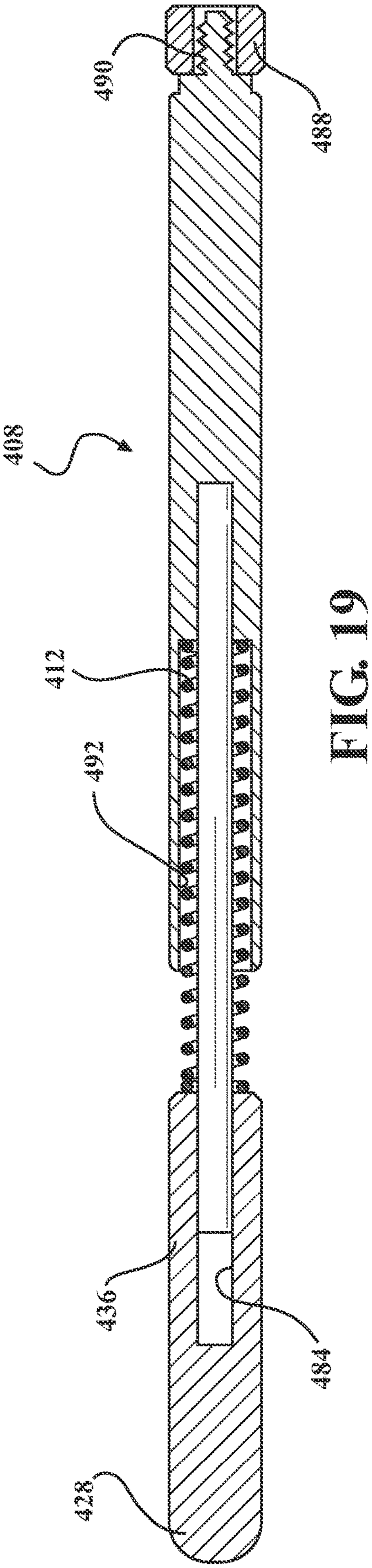
FIG. 19 is a cross sectional view of a lift assist, in accordance with aspects of the present invention.

According to aspects of the present invention, the lift assist assembly 406 includes, rather than a cylinder 410 with plunger 412 arrangement, an internal lift mechanism 408 that incorporates at least one compression spring 492 (e.g., see FIG. 19). The plunger 412 could additionally be omitted in the compression spring arrangement, according to aspects of the present invention.

It is understood that the lift assist mechanism 408 can, by way of non-limiting example, alternatively or in combination, be an internal gas strut, hydraulic gas spring, gas strut, gas spring, locking gas strut, rod and cylinder, longitudinal compression, gas spring shock, lift support, gas spring, gas damper, gas spring force and compression, shock, piston mounted on a rod and slidable in a sealed cylinder of gas, adjustable gas strut, damper, rod and cylinder, push or pull force(s) in either or more than one position and direction the front rail 414 is traveling, or any lift assist mechanism suitable for control movement of the assembly 400 to/from the closed position from/to the open position depending on the application without departure from the scope of the present invention.

While an exemplary pivot joint 418 is described and shown on the guide 416, it is understood that the pivot joint may be any alternative location suitable for rotating the front rails 414 with lift assist.

Referring more particularly to FIGS. 2-4 and 6-8 there is depicted the pivotal portion 401 moving from a closed position to an open position.

Referring to FIGS. 1-19 generally, at least one second bow 438 is rotatably connected to the pair of front rails 414 at a pivot points 440,440, e.g., a second bow 438 that is a fabric management bow operably listed or connected to a fabric cover. At least one third bow 442 is rotatably connected to the pair of front rails 414 at pivot points 444,444, e.g., a second bow 442 that is a fabric management bow operably listed or connected to a fabric cover. At least one link 446 is pivotally connected between the second and third bows 438,442 at pivot points 448,448 and 450,450. At least a pair of rear rails 452 are pivotally connected to the third bow 442 at pivot point 454, and rotatably connected to a rail 458 at pivot joint 458. It is understood that more or less bows, links, and rails may be used depending on the application without departure from the scope of the present invention.

Figure 11:
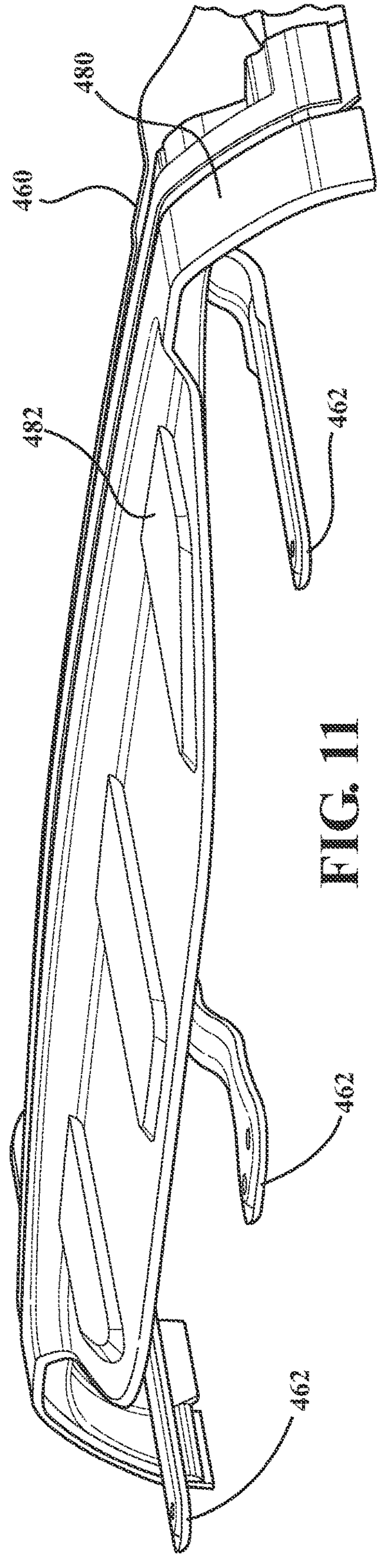
FIG. 11 is a perspective view of a rear header of the soft top cover assembly including a plurality of attachments adapted to connect to an exemplary hardtop of an SUV, in accordance with the present invention.
Figure 12:
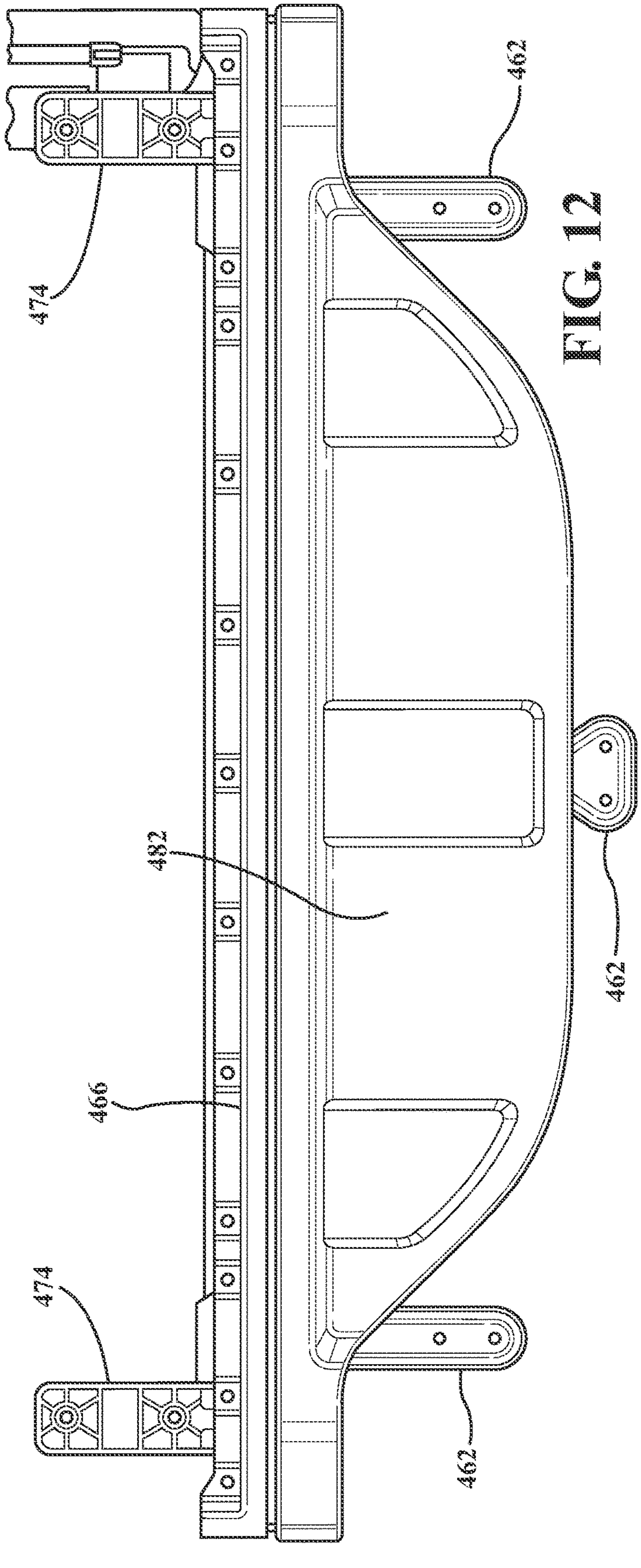
FIG. 12 is a top plane view of FIG. 11, in accordance with the present invention.

Referring more particularly to FIGS. 11-12, there is provided a rear header 460 operably adapted to provide a weather tight seal with the vehicle (e.g., hard top). The assembly 400 includes a plurality of attachment members 462, e.g., brackets, adapted to attach to the vehicle, e.g., to attach the topstack to a hardtop.

Optionally, the rear header has two mounts for bolting on a retractable sunscreen that attaches to the brackets for the windshield lock points on the windshield frame.

The rear header is made from a composite (e.g., glass fiber reinforced thermoplastics (e.g., ABS vacuum formed injected molded, rotocasted or anything else) preferable but could be any material aluminum stamped steel milled steel or any other suitable material.

Figure 13:
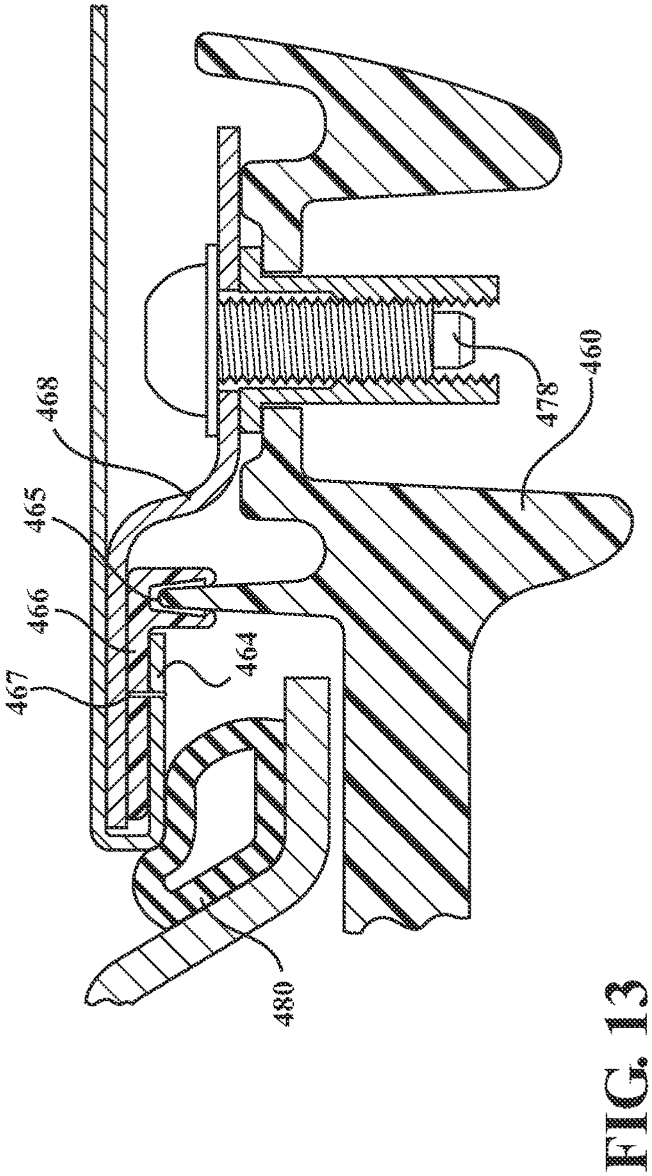
FIG. 13 is an enlarged side elevation cross section view of FIG. 14 depicting a soft top cover of the soft top cover assembly attached to the rear header, in accordance with aspects of the present invention.
Figure 14:
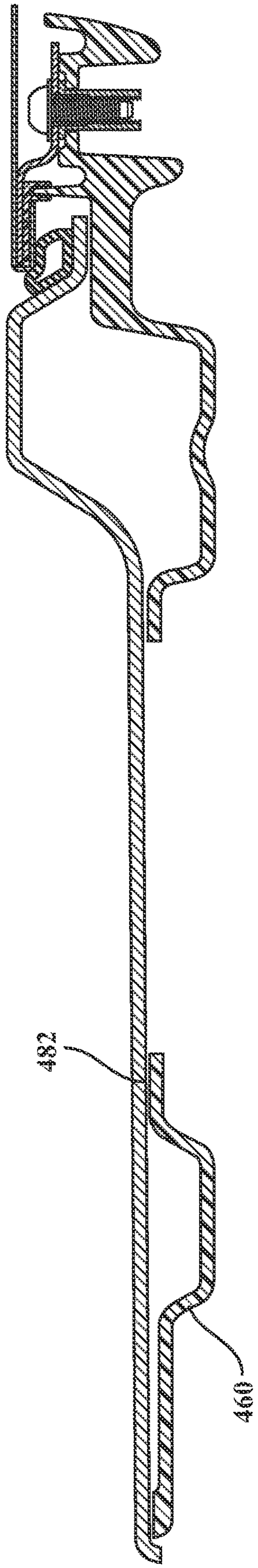
FIG. 14 is a side elevation cross section depicting a soft top cover of the soft top cover assembly attached to the rear header, in accordance with the present invention.

Referring more particularly to FIGS. 13-14, the top cover 464, e.g., soft top cover, is operably attached to at least one retainer 466, e.g., sewn 467 to the retainer 466. The at least one retainer 466 is captured on at least one lip 465 of the rear header 460 for capturing the cover 464. The top cover 464 is attached to the rear header 460 (e.g., snapped to the rear header (or "rear halo"), and then held down by at least one second retainer 468 that is operably fastened, e.g., screwed, down to the rear header 460 with a plurality of fasteners 478. It is understood that any alternative cover 464 attachment arrangement suitable for capturing and tensioning the cover 464 is contemplated depending of the application without departure from the scope of the present invention. The forward end of the top cover 464 is operably connected to the front bow 402.

According to aspects of the present invention, the rear header 460 may include engagement to at least one seal 480. The assembly 400 may include at least one panel 482 adapted to generally mimic and follows the geometry of the vehicle and is adjacent the rear header 460. Preferably, the panel 482 and rear header 460 are operably connected, e.g., bonded, adhered, etc., and, as an assembly, adapted to bracket to existing vehicle body structure. The rear assembly may be, by way of non-limiting example, a die cast aluminum lower (e.g., rear header 460), and an ABS upper (acrylonitrile butadiene styrene), e.g., panel 482.

Figure 15:
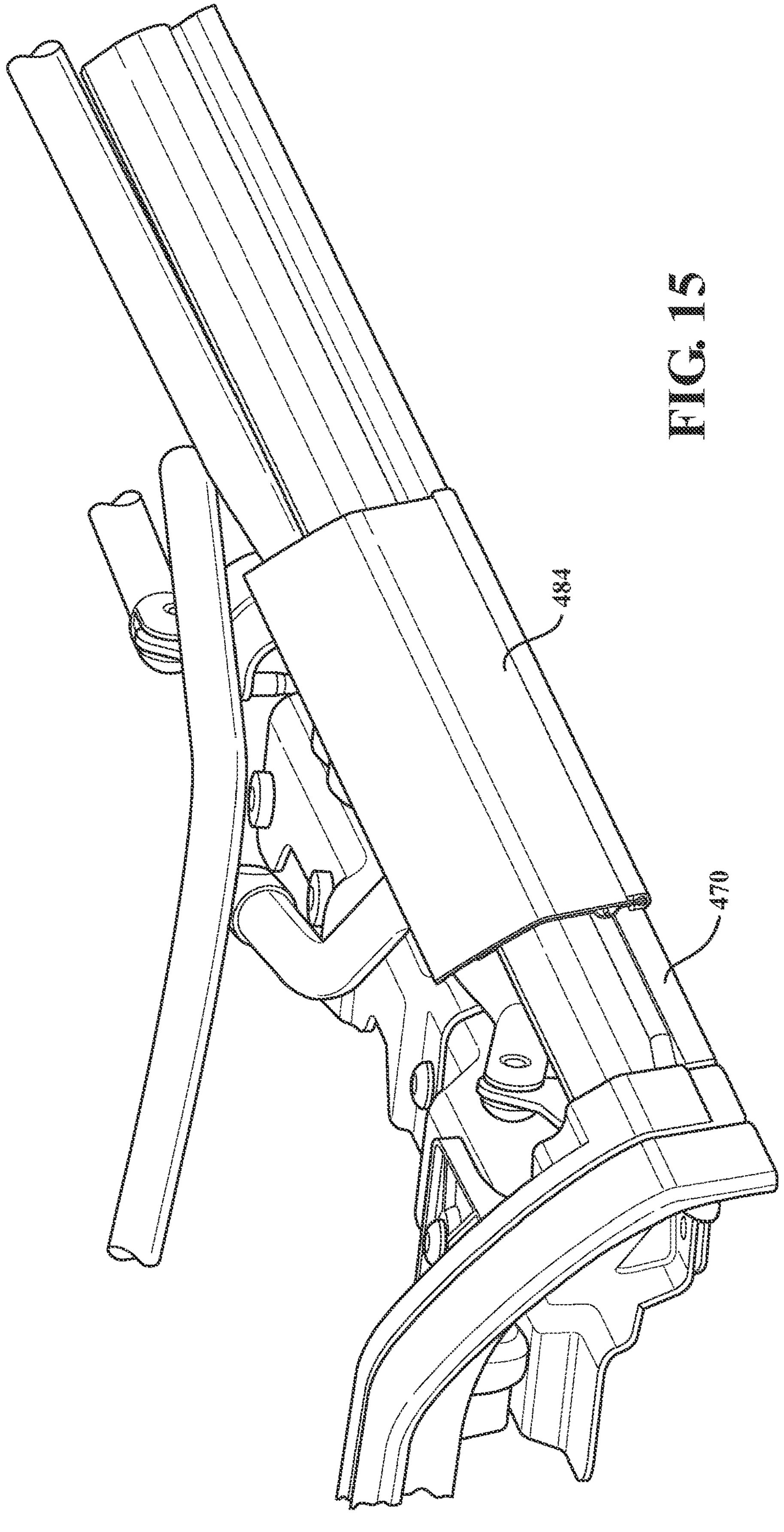
FIG. 15 is a perspective view of the soft top cover assembly with door rails, in accordance with aspects of the present invention.
Figure 16:
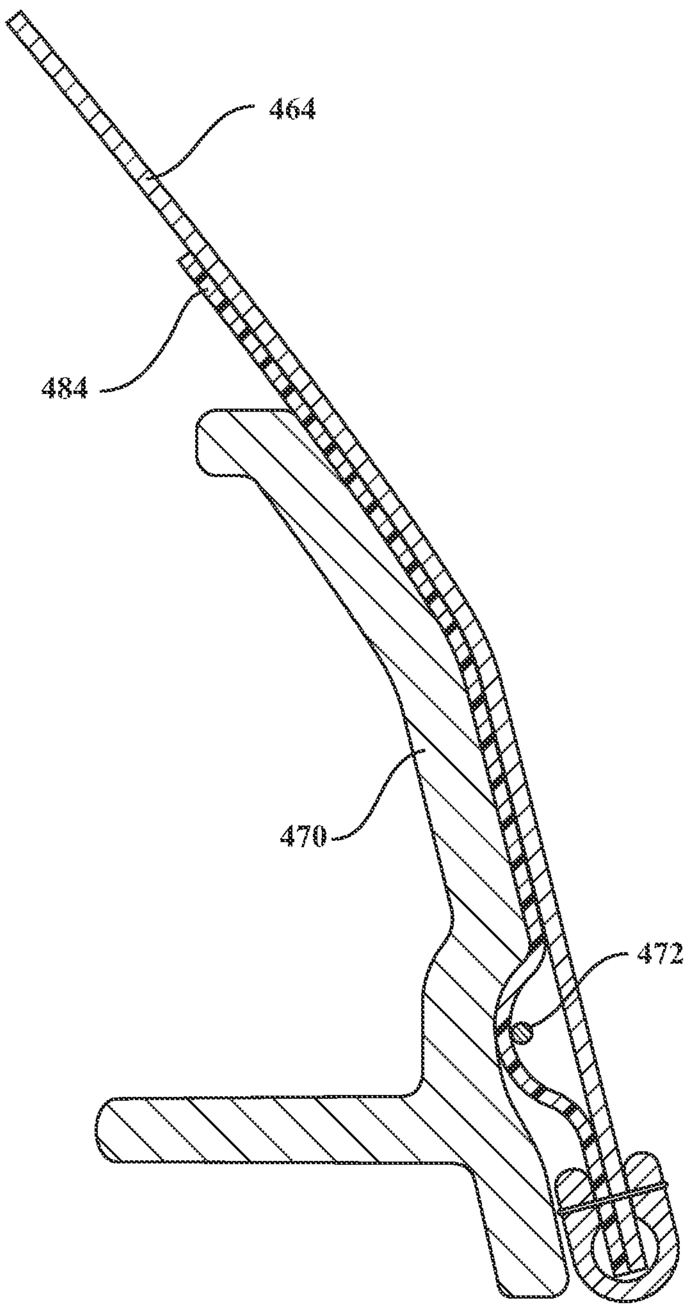
FIG. 16 is a side cross section view of the soft top cover with tensioning feature pressed against the door rail, in accordance with the present invention.

Referring more particularly to FIGS. 15-16, the assembly 400 preferably includes at least one door rail, shown generally at 470, preferably a plurality of door rails, creating at least one sealing surface along each side of the vehicle for the opposing sides of the cover 464. At least one tensioning member 472 (e.g., cable, cable sewn into the top cover 464) puts tension on each door rail 470 to seal out weather elements.

Figure 17:
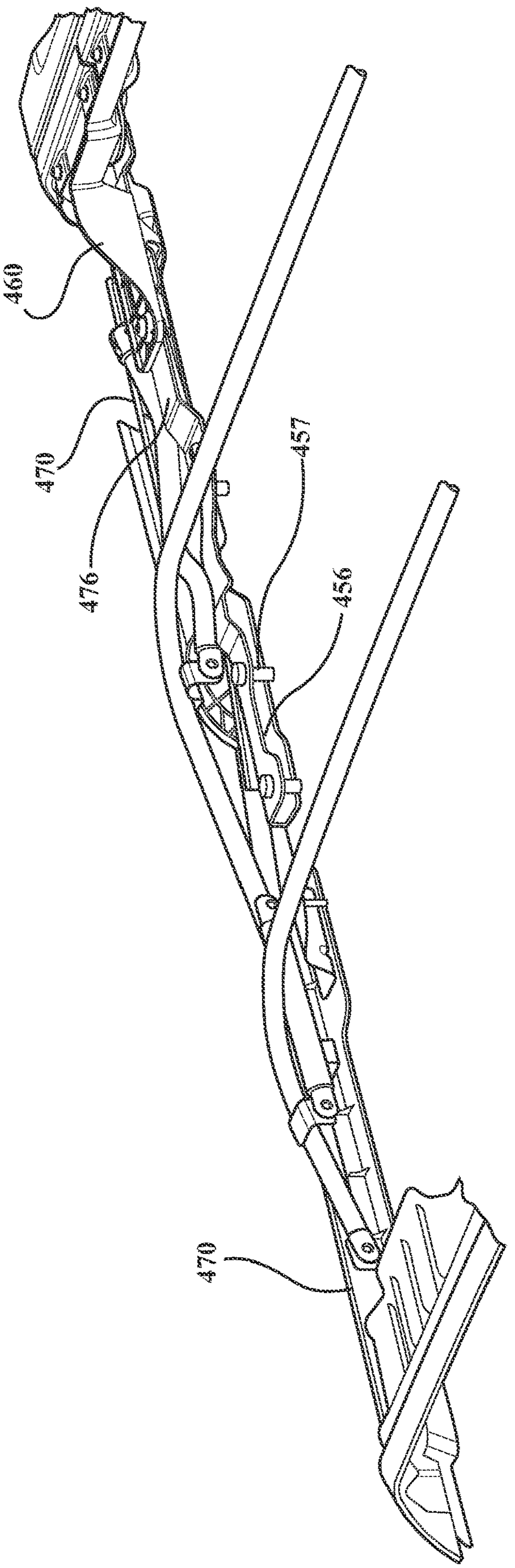
FIG. 17 is a perspective view of the soft top cover assembly with the rear header including a mounting element adapted to connect to the SUV, in accordance with the present invention.
Figure 18:
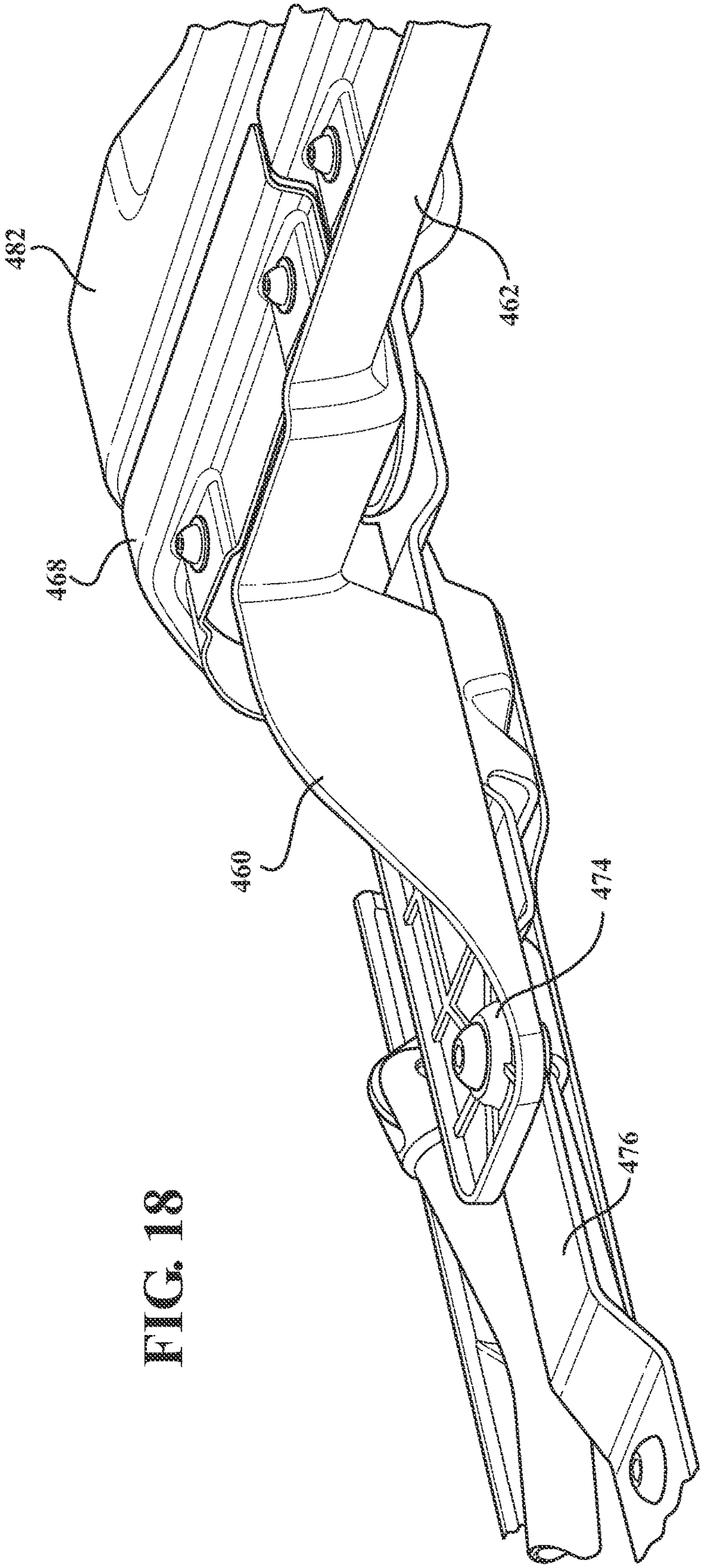
FIG. 18 is an enlarged view of FIG. 17.

Referring more particularly to FIGS. 17-18, at least two attachment members 474 of the rear header 460 is operably attached to at least two brackets 476 adapted to operably mount to the vehicle adjacent opposing sides of the roof top opening, e.g., brackets 476 adapted to mount to the opposite side sport bars, and/or mounting member 456. Mounting member 456 is adapted to operably mount to the vehicle adjacent opposing sides of the roof top opening, e.g., each adapted to mount to the opposing sides sport bars with at least on fastener 457, and may, according to aspects of the present invention, be integrally formed with or operably coupled to the guide element 416.

The assembly 400 is adapted to operably connect to the vehicle at a roof top opening, e.g., sport bars, cross members, windshield frame, pillar(s), predetermined vehicle structure, etc.). The rail 470 can be adapted to operably connect to a roll bar or sport bar of an SUV adjacent opposite sides of the roof top opening. It is understood that the rail 470 is adaptable to operably connect to any predetermined vehicle component and/or the rear header 460 depending on the application without departure from the scope of the present invention.

It is understood that the right side is preferably substantially a mirror-image of the left side.

The present invention is adapted for attachment to a sport utility vehicle or any other vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A folding soft top cover assembly adapted for a sport utility vehicle, comprising:

a pivotal portion adapted for attaching at a roof top opening of a vehicle;

a cover connected to the pivotal portion to selectively close off the roof top opening and open up the roof top opening for an open air experience;

a pair of front rails; and at least one lift assist assembly providing lift assist to said pivotal portion, wherein each at least one lift assist assembly includes an internal gas strut located within each front rail of the pivotal portion.

2. The folding soft top cover assembly of claim 1, wherein each at least one at least one lift assist assembly further includes a front rail tube having at least one cylinder and plunger located within said front rail tube and positioned with a stop.

3. The folding soft top cover assembly of claim 1, wherein the at least one lift assist assembly further includes a cylinder riding along a surface of a guide.

4. The folding soft top cover assembly of claim 1, wherein the cover engages a surface of at least one door rail for a weather tight seal.

5. The folding soft top cover assembly of claim 1, further comprising a plurality of attachment members adapted to operably attach the assembly to a hardtop of the vehicle.

6. The folding soft top cover assembly of claim 1, further comprising a retainer connected to the cover and connected to a rear header.

7. The folding soft top cover assembly of claim 1, further comprising a rear header adapted to connect adjacent to the roof top opening.

8. The folding soft top cover assembly of claim 7, further comprising a retainer connected to the cover, said cover connected to the rear header.

9. The folding soft top cover assembly of claim 1, further comprising a second retainer, said second retainer fastened to a rear header.

10. The folding soft top cover assembly of claim 1, further comprising a plurality of door rails creating a sealing surface along an outer surface for the cover.

11. The folding soft top cover assembly of claim 10, further comprising a tensioning member connected along opposite side edges of the cover to place tension against the door rail for a weather tight seal.

12. The folding soft top cover assembly of claim 11, wherein the tensioning member is a cable sewn to the cover.

13. The folding soft top cover assembly of claim 1, wherein the at least one lift assist assembly is a plunger or cam lift assist system.

14. The folding soft top cover assembly of claim 1, wherein the at least one lift assist assembly includes at least one compression spring.

15. The folding soft top cover assembly of claim 1, wherein the at least one lift assist assembly is a compression spring in a cylinder lift assist system.

16. The folding soft top cover assembly of claim 1, further comprising a pair of stops, where each one of the pair of front rails contacts a respective one of the pair of stops when the pivotal portion is in an open position operable to set a height of the front rail off the vehicle.

17. A folding soft top cover assembly adapted for connecting to a sport utility vehicle, comprising:

a pivotal portion adapted for attaching at a roof top opening of a vehicle and selectively rotatable to close off the roof top opening and open up the roof top opening for an open air experience;

a pair of front rails including a tubular section;

at least one pair of lift assist assemblies including a lift assist mechanism located within the tubular section and including a rounded end extending out of the tubular section; and a pair of guides each including a predetermined guide surface profiled for the rounded end to travel along the surface operable to provide lift assist in combination with the lift assist mechanism.

18. A lift assist assembly adapted for a rotatable soft top cover assembly, comprising:

at least one lift assist mechanism adapted to fit inside a tubular member of the rotatable soft top cover assembly, said at least one lift assist mechanism includes a buffering lift assist member and a cylinder riding along a predetermined contoured surface of a guide, wherein said at least one lift assist mechanism is incorporated as part of a plunger or cam assist system.

19. The lift assist assembly of claim 18, wherein the buffering lift assist member includes at least one compression spring.

* * * * *